Patented Aug. 27, 1946

2,406,684

UNITED STATES PATENT OFFICE 2,406,684

POLYMERIZATION OF METHYL ISOPROPENYL KETONE

Josef W. Heyd, Dayton, Ohio, assignor to Monsanto Chemical Company, a corporation of Delaware No Drawing. Application June 28, 1943, Serial No. 492,533

11 Claims. (Cl. 260—64)

The present invention relates to the polymerization of methyl isopropenyl ketone and more particularly to the polymerization of said ketone in aqueous solution.

The polymerization of methyl isopropenyl ketone to give either rubbery or hard, glass-like compositions has been known for a long time. Although much interest has been shown in the glass-like polymerides which are obtainable under certain conditions from methyl isopropenyl ketone, the production of such polymerides on a technical scale has not been hitherto feasible because of the long polymerizing time which is required for conversion of the monomeric ketone to the colorless and transparent, hard polymer. Staudinger (Berichte, 67, 1773 (1934)) has reported, for example, that from 8 to 10 weeks are required for the formation of hard, transparent masses from methyl isopropenyl ketone in a nitrogen atmosphere at room temperature and from 4 to 6 weeks are required to produce this change when the ketone is allowed to stand under ordinary atmospheric conditions at the same temperature. While he found that polymerization could be accelerated by the use of ultra-violet radiations, the polymer which he obtained after five days had a very low molecular weight. He was unable to accelerate the polymerization by increasing the temperature to that employed in the conversion of other polymerizable compounds, for example, styrene, to high polymerides in the absence of catalysts because at temperatures of 95° C. to 100° C. the ketone was converted almost exclusively to the dimeric product (c. f. J. Chem. Soc. (1938) 885–91).

While the use of catalysts for accelerating the polymerization of methyl isopropenyl ketone has been studied by a number of investigators, until now no catalyst has been found which would give good yields of the colorless, transparent, hard, polymeric ketone within a technically feasible length of time. Marvel and his co-workers (J. Amer. Chem. Soc. 64 93 (1942)) have reported, for example, that in the presence of 1% of benzoyl peroxide at a temperature of 25° C. an approximately 62% conversion of the monomeric ketone to a polymer having an average molecular weight of 36,000 was obtainable only after 5 weeks. Rutovskii and Dmitrieva (J. Applied Chem. U. S. S. R. 14 535–41 (1941)) attempted to decrease polymerization time by employing both a catalyst and higher temperatures. They found, however, that in the presence of benzoyl peroxide even after 65 hours at 110° C. hardening did not take place and the product remained a viscous liquid. Their best results were obtained by polymerization at a temperature of 50° C. for approximately one week in the presence of 0.25% of benzoyl peroxide, a high molecular weight solid being obtained in this manner. Both Marvel and Rutovskii report that solution polymerization of methyl isopropenyl ketone leads to the production of low molecular weight products. While emulsion polymerization of methyl isopropenyl ketone is disclosed in the Meisenburg Patent Number 2,005,295, the procedure described therein leads to the formation of a colored product and also requires a time of over one week.

I have investigated the use of a great number of polymerizing catalysts and have found that the use of catalysts in the polymerization of isopropenyl methyl ketone is complicated by the fact that in the presence of either basic or acidic materials the ketone undergoes a condensation, rather than a polymerizing reaction, yielding polymeric ketones, aldols, ethers, or mixtures thereof, in the form of oils instead of the desired solid polymerides. Since such condensations are apparent at temperatures of over 95° C. even in the substantial absence of acids or bases, in the presence of these materials reactions of this type take place almost to the exclusion of polymerization at temperatures which are substantially below 90° C. and may even take place at room temperatures, depending upon the concentration and nature of the individual acidic or basic material present. Therefore, the maintenance of substantial neutrality, or at least the maintenance of a pH within the narrow range of from 6.0 to 7.5 is of utmost importance in the production of valuable resinous materials from methyl isopropenyl ketone. The customarily employed organic peroxides are of little value in promoting the polymerization of the ketone since they tend to decompose with formation of acidic products.

Now I have found that I am able to obtain good yields of colorless, transparent, hard, polymeric methyl isopropenyl ketone within a period of from a few hours to several days by effecting polymerization of the monomeric ketone while dissolved in weak aqueous solutions of hydrogen peroxide, in the presence or absence of formaldehyde. Methyl isopropenyl ketone is soluble in water to the extent of from 3% to 5%, depending upon the temperature at which solution is effected. When such solutions of the ketone are allowed to stand at increased temperatures, say, at temperatures of from 50° C. to 90° C. in the presence of hydrogen peroxide for a time varying from 2 hours to 7 days, white polymeric methyl isopropenyl ketone precipitates from the aqueous reaction mixture. Upon separation of the polymer, either by decantation or by filtration, there is obtained, upon drying, the white, powdery polymer suitable for use as a molding powder, which is readily converted to water-clear, hard, resinous products by a hot molding operation. While, as may be apparent to those skilled in the art, it is possible to increase the solubility of methyl isopropenyl ketone by the employment of mixtures of water with alcohol, acetone or other solvents, the use of such expedients is not desirable or at all recommended when the object is to obtain good yields of a final product of good color, clarity and high molecular weight. The limited solubility of methyl isopropenyl ketone in water is a fortuitous circumstance for the successful production of good yields of desirable polymer in that there is thus achieved so high a dilution of the monomer that too rapid a reaction, leading to the formation of the low-molecular weight polymers which are produced when reaction is effected in the presence of a solvent such as acetone, is apparently thereby prevented. In the absence of organic solvents, moreover, I am able to get colorless products when operating at temperatures of from 80° C. to 95° C., where as Rutovskii, in the work referred to above, found that when effecting the polymerization of methyl isopropenyl ketone in acetone, benzene, or alcohol solutions the use of a temperature of either 70° C. or 90° C. resulted in the formation of colored products.

It is, moreover, inadvisable to use in the reaction mixture an excess of monomer over that which is soluble in water at the reaction temperatures employed. Apparently only that portion of the monomer which is actually dissolved in the water undergoes polymerization to give the desirable, colorless, high-molecular weight products; for when there is present in the reaction mixture any substantial amount of undissolved monomer, the polymerization products are colored and often retain the odor of the monomer.

The quantity of hydrogen peroxide which is advantageously employed may vary to from 0.10% to 12% by weight of $H_2O_2$ based on the monomeric ketone present in the aqueous solution. While amounts of hydrogen peroxide equal to less than 1.0% based on said monomer give progressively lower conversions as catalyst amount is decreased, very good conversions are obtained even when operating in the presence of, say, 0.25% of hydrogen peroxide, a 52% conversion of monomer to polymer being obtainable within 24 hours at 90° C. when working with a 3% aqueous solution of monomer. The preferred concentration of catalyst with respect to monomeric ketone, however, ranges from 0.5% to 2.0%.

The presence of impurities in the monomeric methyl isopropenyl ketone should be avoided. I have investigated, for example, the effect of the presence of even minute quantities of such impurities as may be expected to be present from the manner in which the olefinic ketone is prepared, and have found that the presence of 0.5% of methylol ethyl methyl ketone or methyl ethyl ketone leads to the production of colored products and lowered yields when polymerization of methyl isopropenyl ketone is effected in aqueous solution in presence of hydrogen peroxide as herein described. Where acidic materials are used as dehydrating agents in the production of the ketone from the ketol, traces of acid may be present in the monomeric ketone without adversely affecting the color of the polymer when prepared by the present process. However, when such a monomer is polymerized in mass or in organic solvents, highly colored products result due to the presence of traces of acid.

Surprisingly, however, the presence of formaldehyde in the reaction mixture, say, in amounts of from 0.1% to 2.0% by weight of HCHO based on the monomeric methyl isopropenyl ketone has an accelerating rather than an inhibiting effect on the course of the polymerization, and the products thereby obtained are of substantially the same good clarity, color and hardness as those which are obtainable in the absence of formaldehyde. Accordingly, this aldehyde may be considered as a promoter in the polymerization of monomeric methyl isopropenyl ketone in aqueous solution in the presence of hydrogen peroxide, and the present invention includes a method of polymerization when effected either in the presence or absence of formaldehyde.

The polymeric methyl isopropenyl ketone which is obtained by conducting the polymerization by the process herein described is a white powder which is readily converted, for example, by hot molding under pressure to give hard, water-clear, colorless plastic materials of excellent mechanical strength and resistance to moisture. The present polymeric materials have good flow and the moldings produced therefrom retain even minor surface indentations of the mold. The polymeric methyl isopropenyl ketone produced by the present process is, therefore, of great value for the production of molded, irregularly shaped articles, lithograph plates, etc., where accurate and faithful reproduction is desired. The colorless, transparent molded sheets of the resin have a very high tensile strength, greatly exceeding that of polystyrene, for example, and are advantageously employed as substitutes for glass in the manufacture of impact-resistant automobile windshields, airplane turrets, etc.

The invention is further illustrated, but not limited, by the following examples:

*Example 1*

A mixture consisting of 750 cc. of water, 20 g. of methyl isopropenyl ketone and 0.6 cc. of 30% aqueous hydrogen peroxide was held at a temperature of 90° C. for 42 hours. At the end of this time, the white, copious precipitate which was formed was filtered through a Buchner funnel without suction, then suctioned, washed and dried to constant weight. There was thus obtained 13.2 g. (66% conversion) of the white, powdery, polymeric methyl isopropenyl ketone. Distillation of the filtrate showed that there had been an approximately 10% conversion to a viscous oily, condensation product; about 15% of the initial monomeric ketone was recovered unchanged. Based on the unrecovered ketone, the yield of polymer obtained was 77%. The unreacted ketone, being readily separated from the other products present in the filtrate, can be advantageously employed in subsequent polymerizations.

Molded test specimens of the dried polymer were colorless, transparent products of good mechanical strength and resistance to moisture. The resin is soluble in ketones and esters and insoluble in alcohols and ethers.

*Example 2*

Polymerization of methyl isopropenyl ketone was effected as in Example 1, except that here there was used 1.2 cc. of 30% aqueous hydrogen peroxide and the polymerization time was only 16 hours. A 51% conversion of monomeric ketone to the white, powdery polymer was obtained.

In two subsequent runs, employing the same concentration of the monomeric ketone in water and the same quantity of hydrogen peroxide, but extending the polymerization time to 22 hours and to 24 hours, respectively, there was obtained a 57% conversion of monomer to polymer in the 22 hour run and a 60% conversion in the 24 hour run.

The polymers formed in the three runs of this example all possessed the excellent color and transparency of the polymer described in Example 1.

Example 3

A mixture consisting of 700 cc. of water, 20 g. of methyl isopropenyl ketone and 2 cc. of 30% aqueous hydrogen peroxide was polymerized for 120 hours at a temperature of 60° C. Upon filtration, washing and drying, as in Example 1, there was obtained 11.5 g. of the white, powdery, polymeric methyl isopropenyl ketone, the conversion of monomer to polymer being 58%. The polymer had a melting point of approximately 187° C., a softening point of 130° C., and gave upon molding colorless, transparent products of good mechanical properties.

Example 4

This example illustrates the accelerating effect of formaldehyde upon the hydrogen peroxide-catalyzed polymerization of isopropenyl methyl ketone. When to the initial monomeric mixture described in Example 3 there was added a quantity of formaldehyde corresponding to 0.10% of the monomeric isopropenyl methyl ketone, and the polymerization was effected as in Example 3 for a time of 120 hours at a temperature of 60° C., there was obtained 14.0 g. of the polymeric ketone. Here conversion of monomer to polymer was 70%. While the polymer of this example differs from that of the preceding example in that the present polymer has a melting point of approximately 190° C. and a softening point of 145° C., molded test specimens of the polymer are colorless and transparent and have the good mechanical properties of the polymers prepared in the preceding examples.

Example 5

A solution consisting of 17 liters of water, 500 g. of methyl isopropenyl ketone, and 0.75% by weight each of formaldehyde and hydrogen peroxide, respectively, based on the ketone, was allowed to polymerize at a temperature of 60° C. for 148 hours, employing a large Pyrex glass container as the reaction vessel. The precipitated polymer was filtered, with suction, and the precipitate was thoroughly washed, removed from the funnel and dried in an oven at a temperature of 90° C. There was thus obtained 383.8 g. or a 77% conversion, of the white, powdery, polymeric methyl isopropenyl ketone, having a melting point of 216° C. and a softening point of 160° C. Upon molding, the polymer was readily converted to colorless, transparent, resinous products of good machinability and mechanical strength.

Example 6

This example shows the effect of varying concentrations of hydrogen peroxide in the polymerization of methyl isopropenyl ketone at a temperature of 55° C. for a time of 120 hours. Under these conditions the following per cent conversion of the monomeric ketone to the polymer were obtained when runs were made employing 20 grams of the monomeric ketone dissolved in 700 cc. of water and the quantities of 30% aqueous hydrogen peroxide indicated below:

| Run No. | $H_2O_2$, cc. of 30% $H_2O_2$ soln. | Wt. of polymer, g. | Percent conversion |
| --- | --- | --- | --- |
| 1 | 0.00 | 0.0 | 0.0 |
| 2 | 0.10 | 0.1 | 0.5 |
| 3 | 0.25 | 8.0 | 40.0 |
| 4 | 0.50 | 8.0 | 40.0 |
| 5 | 1.00 | 8.0 | 40.0 |
| 6 | 2.00 | 8.0 | 40.0 |
| 7 | 3.00 | 8.3 | 42.0 |
| 8 | 5.00 | 9.3 | 47.0 |
| 9 | 10.00 | 10.0 | 50.0 |

In the above table the per cent concentration of hydrogen peroxide with respect to monomeric ketone ranges from 0.166% for that used in run 2 to 8.33% used in run 9. Within the range of 0.4% to 3.33%, as employed in runs 3 through 6, respectively, there is no perceptible difference in either the extent of conversion obtained or the nature of the polymeric product. While better conversions are obtained with the higher concentrations of the peroxide, the increase in quantity of polymeric material thus obtained is not proportioned to the much larger amounts of catalyst required.

Example 7

This example shows the effect of varying concentrations of formaldehyde in promoting the hydrogen-peroxide catalyzed polymerization of an insufficiently pure methyl isopropenyl ketone.

Four solutions, consisting respectively of 700 cc. of water, 20 g. of methyl isopropenyl ketone, 2 cc. of 30% aqueous hydrogen peroxide and the quantities of formaldehyde indicated below were allowed to polymerize at a temperature of 55° C. for 120 hours. The following conversions were obtained:

| Run No. | Percent HCHO, based on monomer | Percent conversion to polymer |
| --- | --- | --- |
| 1 | 0.00 | 18.0 |
| 2 | 0.01 | 39.9 |
| 3 | 0.10 | 41.0 |
| 4 | 1.00 | 48.0 |
| 5 | 10.00 | 47.0 |

It is apparent that the conversion is doubled by including in the reaction mixture 0.01% of formaldehyde, based on the monomeric ketone, as shown in run 2 of this example. It may be that the significant effect of formaldehyde when used with impure monomer can be explained by its ability to counteract the adverse effect of some of the impurities present therein.

When effecting the hydrogen peroxide-catalyzed polymerization of methyl isopropenyl ketone in the presence of formaldehyde, care must be taken to wash very thoroughly the precipitated polymer previous to drying, for I have found that small amounts of formaldehyde in the powdery polymer have an unfavorable effect on the moldability and solubility of the product. While polymeric methyl isopropenyl ketones prepared by the polymerization of the monomer in aqueous solution in presence of hydrogen peroxide as herein described resemble previously known high molecular weight polymers of the ketone with respect to solubility, if the hydrogen peroxide-catalyzed polymerization is effected in the presence of formaldehyde and all of the formaldehyde is not removed from the polymer previous to the drying step, the products obtained are unique in that they are insoluble in all of these solvents. Such insoluble resins may be made soluble by irradiating with ultra-violet light.

The polymeric methyl isopropenyl ketones obtained by polymerization of the monomeric ketone in aqueous solution in the presence of hydrogen peroxide either in the presence or absence of formaldehyde as promoter as herein described were tested for solubility in a number of solvents. The following results were obtained:

| Solvent tested | Degree of solubility of polymer |
| --- | --- |
| Acetone | Very soluble. |
| Methyl butyl ketone | Slowly soluble. |
| Diacetone alcohol | Very soluble. |
| Ethyl acetate | Quite soluble. |
| Cellosolve acetate | Very slowly soluble. |
| Cellosolve | Insoluble. |
| Butyl Cellosolve | Do. |
| Carbitole | Do. |
| Glycerol | Do. |
| Benzene | Very slowly soluble. |
| Hexane | Insoluble. |
| Diamylene | Do. |
| 95% ethanol | Do. |
| Absolute ethanol | Do. |
| Tert-amyl alcohol | Do. |
| 2-ethylhexanol | Do. |
| Ethylene chlorohydrin | Softens. |
| Amyl chloride | Insoluble. |
| Methylene chloride | Soluble. |
| Chloroform | Readily soluble. |
| Carbon tetrachloride | Insoluble. |
| Ethylene dichloride | Soluble. |
| Tetrachlorethane | Softens. |
| Ethyl ether | Insoluble. |
| Isoamyl ether | Do. |
| Anisole | Slowly soluble. |
| Formic acid | Soluble. |
| Acetic acid | Do. |

In general, the molded resin shows the same solubilities as the unmolded resin, although it, of course, does not dissolve so rapidly.

In molding, temperatures of from 150° C. to 175° C. and pressures of 2,000 pounds per square inch are advantageously employed to obtain colorless, transparent, molded products. Such molded articles have good machinability and remain permanently thermoplastic.

If desired, prior to molding the polymers may be incorporated with plasticizers, coloring materials, heat and light stabilizers, etc. The properties of the molded products may likewise be modified by admixing the powdery polymer with other polymeric materials, for example, cellulose acetate, polymethacrylates, etc.

Although the present invention has been described with reference to the specific details of certain embodiments thereof, it is not intended that such details shall be regarded as limitations upon the scope of this invention except insofar as included in the accompanying claims.

What I claim is:

1. The method of making polymeric methyl isopropenyl ketone which comprises heating, at a temperature above 50° C. but below 95° C. and in the presence of hydrogen peroxide, a single-phase water solution, having a pH of from 6.0 to 7.5, of methyl isopropenyl ketone in the absence of an organic solvent.

2. The method defined in claim 1 in which said water solution contains a small amount of formaldehyde.

3. The method defined in claim 1 in which said water solution contains between 0.5% and 2.0% by weight of hydrogen peroxide, based on the weight of said ketone.

4. The method of making polymerized methyl isopropenyl ketone which comprises dissolving monomeric methyl isopropenyl ketone in water, having a pH of from 6.0 to 7.5 to form a single phase water solution of said monomeric ketone, said solution excluding any organic solvent for said ketone, adding hydrogen peroxide thereto and then heating the resulting solution at a temperature between 50° C. and 90° C. to produce polymeric methyl isopropenyl ketone insoluble in said solution.

5. The method defined in claim 4 in which method a small proportion of formaldehyde is added to the solution prior to heating.

6. The method of making polymerized methyl isopropenyl ketone which comprises dissolving monomeric methyl isopropenyl ketone in an aqueous solution of hydrogen peroxide so as to form a single phase water solution of said monomeric ketone having a pH of from 6.0 to 7.5 and then heating said solution at a temperature between 50° C. and 90° C., while excluding an organic solvent.

7. The method defined in claim 6, in which method a small proportion of formaldehyde is added to the solution prior to heating.

8. The method of making polymeric methyl isopropenyl ketone, which comprises heating at a temperature between 50° C. and 90° C., in the presence of hydrogen peroxide but in the absence of an organic solvent for said ketone, a single phase water solution of methyl isopropenyl ketone having a pH of from 6.0 to 7.5, said heating being continued until a precipitate is formed in said solution.

9. The method of making polymeric methyl isopropenyl ketone, which comprises heating to a temperature between 50° C. and 90° C., in the absence of an organic solvent, a saturated aqueous solution consisting of monomeric isopropenyl ketone, said solution having a pH between 6.0 and 7.5 and containing also between 0.5% and 2.0% of hydrogen peroxide ($H_2O_2$) and between 0.1% and 2.0% of formaldehyde (HCHO), said peroxide and formaldehyde being based on said ketone.

10. The method of making polymeric methyl isopropenyl ketone, which comprises heating to a temperature between 50° C. and 90° C. a substantially neutral solution consisting of water, monomeric methyl isopropenyl ketone in amount between 3% and 5% by weight of said solution, hydrogen peroxide ($H_2O_2$) in amount between 0.1% and 2.0% based on said ketone and formaldehyde (HCHO) in amount between 0.1% and 2.0% based on said ketone, and then separating insoluble polymeric methyl isopropenyl ketone from said solution, and then drying said polymeric material.

11. The process defined in claim 10 in which the polymeric methyl isopropenyl ketone is washed free of formaldehyde before drying.

JOSEF W. HEYD.